Jan. 20, 1970  G. VINCENT  3,490,239
BREAKWATER STRUCTURE
Filed Sept. 13, 1968

INVENTOR
GEORGES VINCENT
BY
John J. Hart
ATTORNEY

United States Patent Office 3,490,239
Patented Jan. 20, 1970

3,490,239
BREAKWATER STRUCTURE
Georges Vincent, Grenoble, Isere, France, assignor to Societe Grenobloise d'Etudes et d'Applications Hydrauliques (Sogreah), Grenoble, France, a corporation of France
Filed Sept. 13, 1968, Ser. No. 759,729
Claims priority, application France, Sept. 28, 1967, 5,173
Int. Cl. E02b 3/04
U.S. Cl. 61—4
13 Claims

ABSTRACT OF THE DISCLOSURE

Two spaced walls exposed to wave attack are mounted on a breakwater having a sloping wall on the seaward side. The wall facing the open water forms a deflector and is constructed to divide the rising surge of water formed by a wave into two sheets, one of such sheets being deflected by such wall back to the open water, and the other sheet passing through such wall to the second wall which is constructed to throw such other sheet of water back onto the space between the two walls. The breakwater may be of any suitable construction, but preferably is mobile so that it can be moved from place to place. Such a mobile breakwater is disclosed herein as a caisson-like beam having means for temporarily anchoring it to the sea bottom.

THE INVENTION

This invention relates to marine breakwater structures and more particularly relates to an improved breakwater structure capable of preventing surges of water from passing thereover.

The construction of this invention is especially applicable to breakwaters having sloping faces which may or may not be smooth. In accordance with the invention, there is provided on the top of the breakwater a first longitudinally extending wall having an outer face facing the open water and located to form above the upper part of the breakwater a substantial extension of the slope of the breakwater exposed to the waves. The outer face of such first wall is provided with an elongated opening above the breakwater crest so that such wall can divide the rising surge of water caused by the arrival of each wave into two sheets, one of which passes through such opening, and the other or upper one of which surges up the outer face of the first wall. The outer wall face above the opening is formed to deflect the upper divided sheet of water back to the open water. The lower divided sheet of water passes through the opening into a space formed between such first wall and a second deflecting wall mounted on the upper part of the breakwater to the rear of and at a certain distance from the first wall. The deflecting face of the second wall is configured to deflect the sheet of water pouring through such space so that it will fall back into the space between the two walls, from whence it is evacuated through the opening in the first wall towards the open water when the surge of water recedes.

It has been found that the aforesaid double-deflection arrangement in accordance with the invention, permits a better distribution of the stresses acting on the crown of the breakwater and also distributes these stresses in respect of time, due their non-simultaneous action on the two deflectors. It has also been found that such double-deflection arrangement enables the prevention of the passage of water over breakwaters having crowns which are substantially lower than is required in conventional breakwaters to accomplish this result. It has been further found that such double wall construction affords distinct advantages in the construction and operation of caisson-type mobile breakwater structures.

Figure 1:
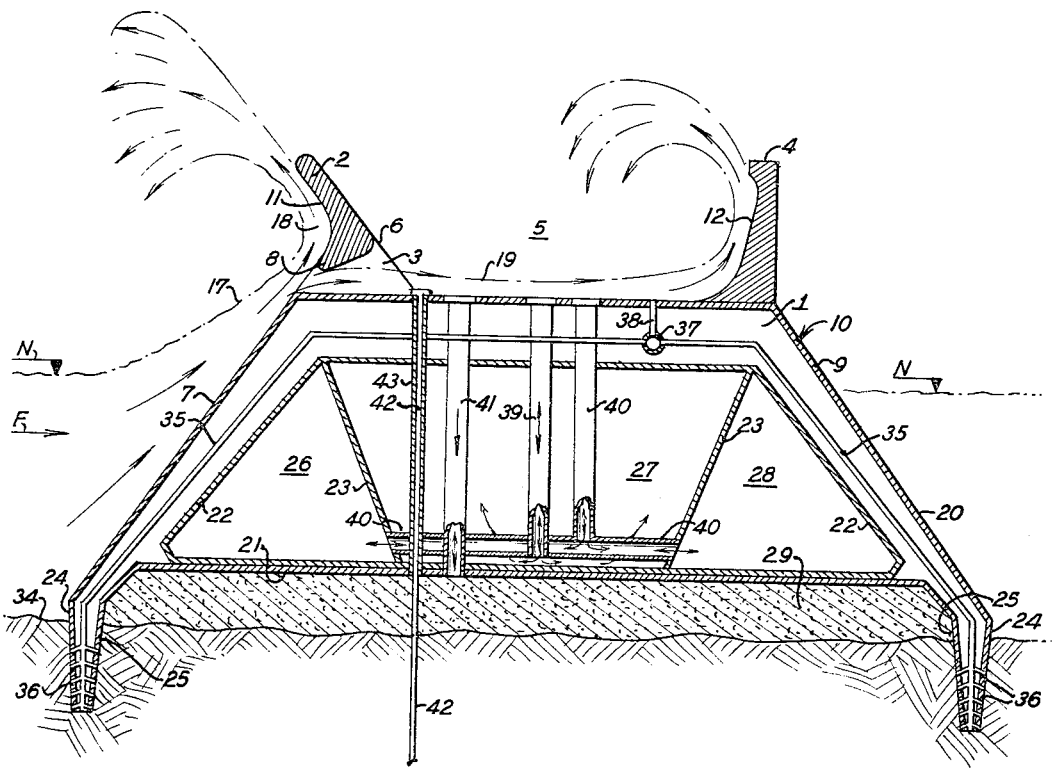
Figure 2:
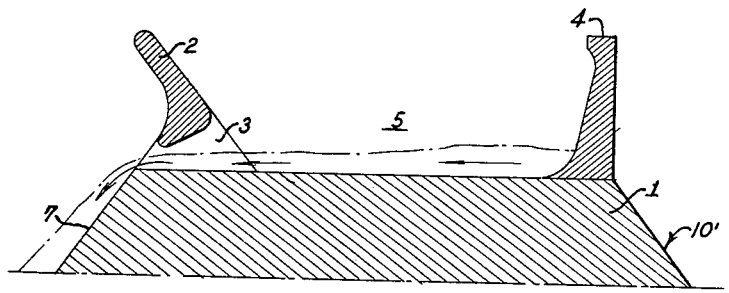

For a better understanding of the invention, reference is made to several practical embodiments illustrated by way of example in the accompanying drawings, in which:

FIG. 1 is a diagrammatic vertical sectional view of a mobile breakwater structure embodying the invention and showing its operation during the arrival of a wave; and FIG. 2 is a similar view of the upper part of a fixed breakwater structure and showing the manner in which the water is drained from between the walls during the recession of a wave.

Referring to such drawings, the numeral 1 designates the upper portion of a sloping-face breakwater which may be a mobile type structure such as that designated generally by the reference numeral 10 in FIG. 1, or a fixed type structure such as that designated generally by the reference numeral 10' in FIG. 2 of the drawings. Mounted on such upper portion 1 are means constructed to provide for double deflection of waves in accordance with the invention. Such double-deflection means comprises a first deflecting wall 2 extending longitudinally along the seaward side of the upper breakwater portion 1 so that the outer face 11 thereof faces the open water. The wall 2 is supported by transverse vertical walls 6 in spaced relation to the upper portion 1 so that a longitudinally extending opening 3 broken only by the walls 6, exists between the base of wall 2 and the upper part or portion 1 of the breakwater. The wall 2 is so supported by the transverse walls 6 that its outer face 11 forms an extension of the upstream sloping face 7 of the breakwater. The wall face 11 is given a curvature such that any water surging up the same will be thrown back toward the open water as is shown in FIG. 1 of the drawings. The base of wall 2 is substantially triangularly-shaped in cross-section to give it a foot-like form and has a lower pointed end 8 extending along and forming the top edge of the longitudinal opening 3. The pointed base portion 8 of wall 3 divides the water surging up over the crest of the breakwater face 7 into two sheets 18 and 19. It will thus be seen that the wall 2 serves a double function. It divides the rising surge of water 17 produced by the arrival of a wave into two sheets of water 18 and 19 in the area of the opening 3, and then by its curved surface 11 throws back toward the open water a large part of the surge which strikes it and forms the sheet of water 18.

The sheet of water 19 formed from the surge caused by the wave passes through the opening 3 and across a space 5 toward a second deflecting wall 4 arranged on the upper portion 1 of the breakwater in spaced parallel arrangement in back of the wall 2. The seaward face 12 of the rear wall 4 is formed to deflect the sheet of water 19 striking it so that it will fall back into the space 5 between the two walls. The water that thus becomes temporarily stored in the space 5 is then evacuated through the space 3 in the front wall 2 towards the open water during the recession of the wave as is indicated in FIG. 2 of the drawings.

In the preferred form of the invention the first or front deflecting wall 2 is given a height that is substantially equal to that of the second or near deflecting wall 4. The space 5 between the two walls 2 and 4, the height of each of such walls, the form of their deflecting profiles 11 and 12, and the dimensions of the space 3 formed at the base of the first wall 2 will be determined to take care of both the local marine conditions and the shape and the slope of the face 7 of the breakwater. As is known in the art, these factors can be determined by known rules for guiding the construction of such parts and by tests on models. The area, arrangement and configuration of the opening 3 at the base of the first wall 2 should be such that a substantial part of the surge of water rising on the crest of the slope 7 of the breakwater can pass through it, and that the evacuation of the water in the space 5 between the two walls 2 and 4 can be carried out during the recession of such surge. The opening 3 preferably extends along the whole length of the wall 2 except for the thickness of the supporting transverse wall 6, and if desired such opening may be constituted of two or more superposed rows of openings. Experience has shown that there is an optimum area for the opening 3. If such opening is too large, the surge of water over the crown of the breakwater is too great, and correlatively, the second deflection at wall 4 is excessive. On the other hand, if the area of the opening 3 is too small, a reverse phenomena takes place with the consequent result that the upstream deflecting wall 2 is subjected to high stresses. It is accordingly desirable that an area of the opening 3 be selected so that the stresses on the two walls 2 and 4 while deflecting the divided sheets of water be substantially equal. As previously pointed out, the exercise of these stresses on the two walls will not be simultaneous, but will be separated by an interval of time dependent on the width of the space 5 between the two walls.

The mobile breakwater 10 shown in FIG. 1 of the drawings is made of metal parts and is constituted of an external casing 20 having a transverse section of trapezodial form. The bottom wall 21 of the casing 20 is recessed and forms the lower flooring of the breakwater. The casing is provided along its longitudinal side edges below the bottom wall 21 thereof with downwardly projecting outer side walls 24 and inner side walls 25 forming two continuous downwardly directly longitudinal ridges which function as feet or anchoring means for the breakwater against slippage. The height of the casing is such that the crest of the outer sloping face 7 of its front wall normally projects above the average level of the water to an extent that substantial surges created by the waves will rise up such crest and be dissipated by both deflecting walls 2 and 4. The average level of the water is shown in FIG. 1 by the markers designated N and the direction in which the swell travels is indicated by the arrow F in such figure. Located within the casing 20 is an internal casing 22 also of trapezodial form in transverse section. The bottom wall of the inner casing 22 rests on and is secured in any suitable manner to the bottom wall 21 of the external casing 20. The inner casing 22 is provided with partitions 23 forming three longitudinally extending ballast chambers or tanks 26, 27 and 28.

It will be noted that the two external and internal casings 20 and 22 forming the body of the breakwater, constitute in the longitudinal direction, that is to say perpendicular to the plane of FIG. 1, a caisson beam having a high mechanical resistance to bending and in consequence to permanent deformation, both in the horizontal plane and in the vertical plane. The partitions 23 and the feet formed by the metal plates 24, 25 further enhance the rigidity of the beam against such bending stresses. There is preferably employed a series of such beams placed in end-to-end relation to form a continuous longitudinal breakwater of say about several hundred meters in length. Each of such beams preferably have individual lengths of several multiples of ten meters. The stability of these beams while in use, even though they are of a mobile nature, is assured by the following three features of their construction.

Due to the general trapezodial shape of each beam which is designed so that the front slope 7 thereof is inclined with respect to the horizontal plane in such manner that the vector force resulting from the breaking of a wave or the thrust of a current will have a substantial vertical component directed downwardly on the beam. Preferably also the outer face 9 of the rear wall of the beam will have a slope with an inclination which will increase the area of the base of the beam to an extent that the stability of the beam against overturning is substantially enhanced.

The provision of at least three longitudinally extending ballast tanks with at least two of such tanks forming front and rear ballast tanks 26 and 28, respectively, enables the stability of the breakwater beam or element to be kept under control by the aid of water and/or sand during the transport thereof and while it is being placed in position, that is to say the floatation phase of the mobile element. When the element is properly positioned, a ballast of higher density in the tanks, such as sand, will enhance the stability thereof against the stresses applied thereto because of wave action. The spacings between the side and top walls of the two casings 20 and 22 may or may not be utilized as ballast tanks. Such spacings, especially at the upper portion 1 of the beam may be employed to better advantage as a housing for the mechanical or electrical apparatus that may form part of the required equipment for the independent mobile beam or breakwater element.

The construction of the bottom of the beam enables it to rest on the bottom or floor 34 of the ocean, and along its longitudinal bottom edges, to penetrate into such ocean bottom to a sufficient extent to prevent sliding of the device on such bottom under the thrust of waves or currents. Such penetration may be accomplished either by the weight of the suitably ballasted element, or by means of erosion devices. It will be noted that the downwardly projecting extensions formed by the wall portions 24, 25 along its longitudinal bottom edges are designed so that there may be created a lower chamber beneath the floor 21 of the outer casing 20. It is intended that in certain installations such a created chamber will be filled with solid material 29 so as to form a seating for the lower flooring 21 of the beam body.

It will be understood from the above discussion of the construction of the independent mobile breakwater element or beam 10, that this element is floated to the desired position in which it is to be used. In order to improve the stability of the element while it is being towed to such position, the lateral compartments 26 and 28 are ballasted with water, or with a mixture of water and sand. At the desired site, the element is sunk into position by ballasting the three compartments 26, 27 and 28 with water. The downwardly projecting longitudinal bottom side edges or ridges formed by the wall portions 24, 25 of the outer casing 20, as the element is so being sunk, may be driven into the ocean bottom 34 by erosion of the portions of the latter on which such projecting ridges rest. At the same time, the ballasting of the compartments 26, 27 and 28 preferably is increased to facilitate this driving operation. Such erosion of the emplacements of the side wall projections may be accomplished by jets of water discharged under pressure from a plurality of nozzles or pipes 36 located in such projecting ridges or side edges, and connected by a series of longitudinally spaced pipes or conduits 35 extending upwardly from each side edge through the spaces between the side walls of the casings 20, 22 to a longitudinally extending distributor pipe 37 which may be connected by means of an inlet pipe 38 to a source of water and/or sand under pressure, such as a pump temporarily mounted on the element, or a vessel or a vehicle provided with a pump. It might be stated at this time that the space 5 between the walls 2 and 4 is preferably made wide enough to provide longitudinally of the element, a clear track of sufficient width for the passage of service vehicles or a crane. Such track may also be used by vehicles for supplying water and/or sand through a conduit 39 to the ballast compartment 27, through a conduit 40 to the ballast compartments 26 and 28, and through a conduit 41 to the chamber 29 below the bottom wall 21 of the outer compartment 20, or such conduits may be operated through pipes connected to a supply vessel, as is known to the art.

When the breakwater element is in position on the ocean floor 34, the injection of a sand-water mixture into the lower chamber 29 is then carried out to provide a seating for the lower flooring 21 of the element. The final loading of the three ballast tanks 26, 27 and 28 is then proceeded with by replacing the ballast water in such tanks as much as possible by a ballast of higher density, such as for example, sand which is preferably introduced hydraulically as a water-sand solution. When so desired, it is possible to effect a further anchoring of the breakwater element on the ocean bottom 34 with the aid of a plurality of tie-rods 42 placed in position through pipes 43 extending vertically through the entire body of the element.

When it is desired to refloat the breakwater element 10, the above described operations are carried out in the reverse order. The achorage tie-rods can be cut off in any suitable manner as by explosive. The ballast is then removed from the central chamber 27, followed by progressive removal of ballast from the side chambers 26 and 28. Water under pressure may be injected around the projecting side edges through the nozzle pipes 38 in order to enable such edges to be freed. The removal of ballast from the chambers 26 and 28 is continued until the breakwater element floats.

While there has been shown in the drawing and hereinabove described, preferred embodiments of the invention by way of example, it will be apparent to those skilled in the art that changes may be made therein without departing from the spirit of the invention or the scope of the appended claims.

What is claimed is:

1. A breakwater construction having a sloping face exposed to the action of waves comprising a first wall mounted on the upper portion of the construction and having a deflecting face facing the open water and forming an extension of said sloping face of the construction, an elongated opening between said deflecting face and the crest of the sloping face so that a surge of water produced by the arrival of a wave rising on the crest of said sloping face will in part flow through such opening over the upper portion of the construction and in part rise on said deflecting face, said deflecting face being configured to throw the water rising thereon back toward the open water, and a second wall mounted on said upper portion of the construction in spaced relation to and in rear of said first wall, said second wall having a deflecting face facing and located at a given distance from said first wall and configured to throw the water passing through the opening of said first wall and rising thereon back into the space between said walls, whereby said walls doubly deflect the wave water in preventing the wave passing over the construction.

2. A construction such as defined in claim 1, in which said first deflecting wall has a height substantially equal to that of said second deflecting wall.

3. A construction as defined in claim 1, including means for supporting said first wall in spaced relation above said upper portion of the construction so that said opening is formed between the base of said first wall and said upper portion.

4. A construction such as defined in claim 1, in which said first wall in the area thereof forming the upper edge of said opening is thickened and configured to facilitate the division of the rising surges of water by wave action.

5. A construction such as defined in claim 1, in which the area of said opening is selected to divide the rising surges of water by wave action so that the stresses created on the two deflecting walls by the divided portions of each surge are substantially equal.

6. A breakwater construction having a sloping face exposed to the action of waves, said construction constituting a unitary element of given length and comprising a completely closed outer casing having a generally trapezoidal form in cross-section and with the larger parallel side of said casing located at the base of said element and the smaller parallel side forming the top of said element, that side wall of said element facing the open water constituting the front wall of the element and being so inclined that the vertical component of the vector force created thereon by a breaking wave contributes substantially to the stability of the element under wave action, means provided on the top wall of said casing for preventing breaking waves from passing over the top of said element, longitudinally extending means in said casing forming within said casing a plurality of longitudinally extending ballast-tanks for enhancing the stability of said element and rigidifying said element against longitudinal bending, and means at the the base of said element for maintaining said breakwater element in position on the ocean bottom.

7. A construction as defined in claim 6, in which the rear wall of said element is also inclined, the inclination thereof being such that the area of the base of said element is increased to the extent that the element is substantially stable against overturning.

8. A construction as defined in claim 6, in which said longitudinally extending means in said outer casing includes an inner casing of generally trapezoidal form in cross-section, and the side and top walls of which are spaced from the side and top walls of said outer casing, and partitions in the interior of said inner casing forming with said inner casing said ballast-tanks.

9. A construction as defined in claim 6, in which said means for preventing waves passing over the top of said element comprises a first means located above the front wall of said element for dividing a wave surging up the crest of such front wall and throwing a portion of such wave back into the open water, and a second means spaced in back of said first means and forming a deflector for the portion of the wave surging over the top of the element.

10. A construction as defined in claim 6, in which said maintaining means at the base of said element comprises a pair of elongated projections extending downwardly from the front and rear sides of said element base.

11. A construction as defined in claim 10, in which said projections form with the larger parallel side of said outer casing and the ocean floor a chamber adapted to receive a filling material forming a seating for the element, and conduit means in said element for effecting the delivery of a filling material to said chamber.

12. A construction as defined in claim 10, in which said projections are provided with conduits for discharging jets of fluid capable of eroding the ocean bottom at the positions where said projections engage such ocean bottom and conduit means in said element for delivering fluid under pressure to said discharge conduits.

13. A construction as defined in claim 10, including at least one annular member forming through said element a vertical passage adapted to receive an anchoring member for securing said element to the ocean bottom.

References Cited

UNITED STATES PATENTS

| 62,889 | 3/1867 | Robbins | 61—4 X |
| 1,893,003 | 1/1933 | Schlueter | 61—4 |
| 1,993,291 | 3/1935 | Vermont | 61—4 X |
| 2,080,045 | 5/1937 | Hornsby | 61—2 X |
| 2,396,226 | 3/1946 | Aston | 61—4 X |

FOREIGN PATENTS

| 707,767 | 4/1931 | France. |
| 1,503,543 | 10/1967 | France. |
| 987,271 | 3/1965 | Great Britain. |

PETER M. CAUN, Primary Examiner